(12) United States Patent
Uhr et al.

(10) Patent No.: US 10,541,991 B2
(45) Date of Patent: Jan. 21, 2020

(54) METHOD FOR OAUTH SERVICE THROUGH BLOCKCHAIN NETWORK, AND TERMINAL AND SERVER USING THE SAME

(71) Applicant: Coinplug, Inc., Gyeonggi-do (KR)

(72) Inventors: Joon Sun Uhr, Gyeonggi-do (KR); Jay Wu Hong, Seoul (KR); Moon Gju Suh, Seoul (KR)

(73) Assignee: COINPLUG, INC., Gyeonggi-Do (KR)

( * ) Notice: Subject to any disclaimer, the term of this patent is extended or adjusted under 35 U.S.C. 154(b) by 0 days.

(21) Appl. No.: 16/368,665

(22) Filed: Mar. 28, 2019

(65) Prior Publication Data
US 2019/0306148 A1    Oct. 3, 2019

(30) Foreign Application Priority Data

Mar. 30, 2018 (KR) ........................ 10-2018-0037131

(51) Int. Cl.
*H04L 29/06* (2006.01)
*H04L 9/06* (2006.01)

(52) U.S. Cl.
CPC ........ *H04L 63/0815* (2013.01); *H04L 9/0637* (2013.01); *H04L 63/0807* (2013.01); *H04L 63/10* (2013.01); *H04L 2209/38* (2013.01)

(58) Field of Classification Search
CPC ... H04L 63/0815; H04L 9/0637; H04L 63/10; H04L 63/0807; H04L 2209/38
See application file for complete search history.

(56) References Cited

U.S. PATENT DOCUMENTS

| | | | |
|---|---|---|---|
| 2018/0117446 A1* | 5/2018 | Tran | A61B 5/0022 |
| 2018/0144153 A1* | 5/2018 | Pead | G06F 21/6245 |
| 2018/0181964 A1* | 6/2018 | Zagarese | G06Q 20/40145 |
| 2018/0302222 A1* | 10/2018 | Agrawal | H04L 63/102 |
| 2019/0020661 A1* | 1/2019 | Zhang | G06F 21/30 |
| 2019/0026716 A1* | 1/2019 | Anbukkarasu | G06Q 20/206 |
| 2019/0096210 A1* | 3/2019 | Jarvis | G06Q 10/06 |

* cited by examiner

*Primary Examiner* — Meng Li
(74) *Attorney, Agent, or Firm* — Holzer Patel Drennan

(57) ABSTRACT

A method for authentication based on a blockchain network is provided. The method includes steps of: an authentication-supporting server (a) if verification is requested by a certificate authority (CA) app, verifying a signature value and transmitting an access token to a user device, supporting the CA-affiliate app to transmit a login request to a CA-affiliate server, and registering the access token in the blockchain network, and transmitting a verification request to the blockchain network to transmit the access token to the authentication-supporting server, and register the access token in the blockchain network, and transmitting the access token to the user device, and transmit the login request to the CA-affiliate server, and (b) performing one of (i) verifying the access token, and (ii) transmitting the verification request to the blockchain network, and transmitting a verification-result to the CA-affiliate server, to allow the CA-affiliate app to log in to the CA-affiliate server.

18 Claims, 5 Drawing Sheets

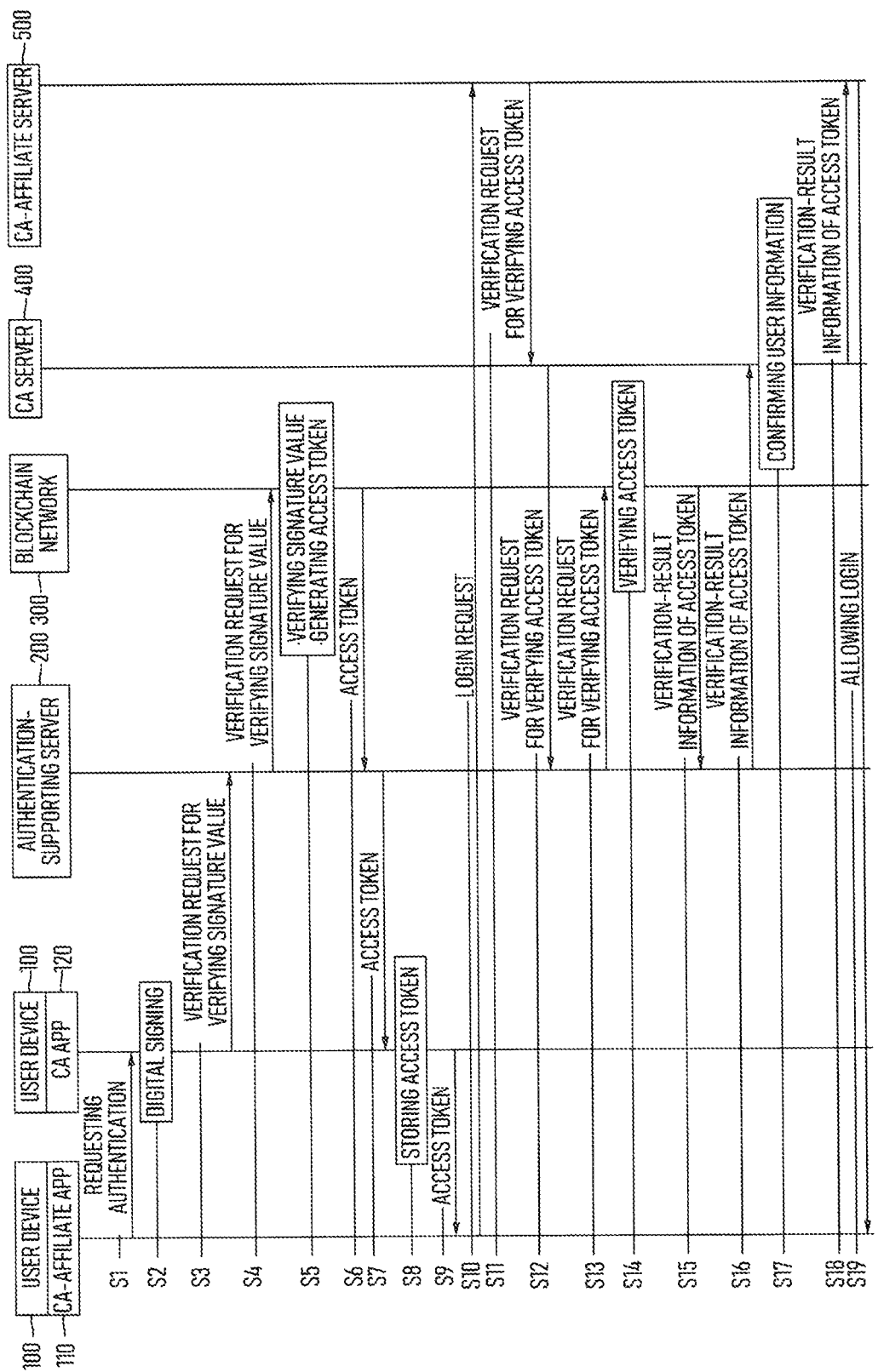

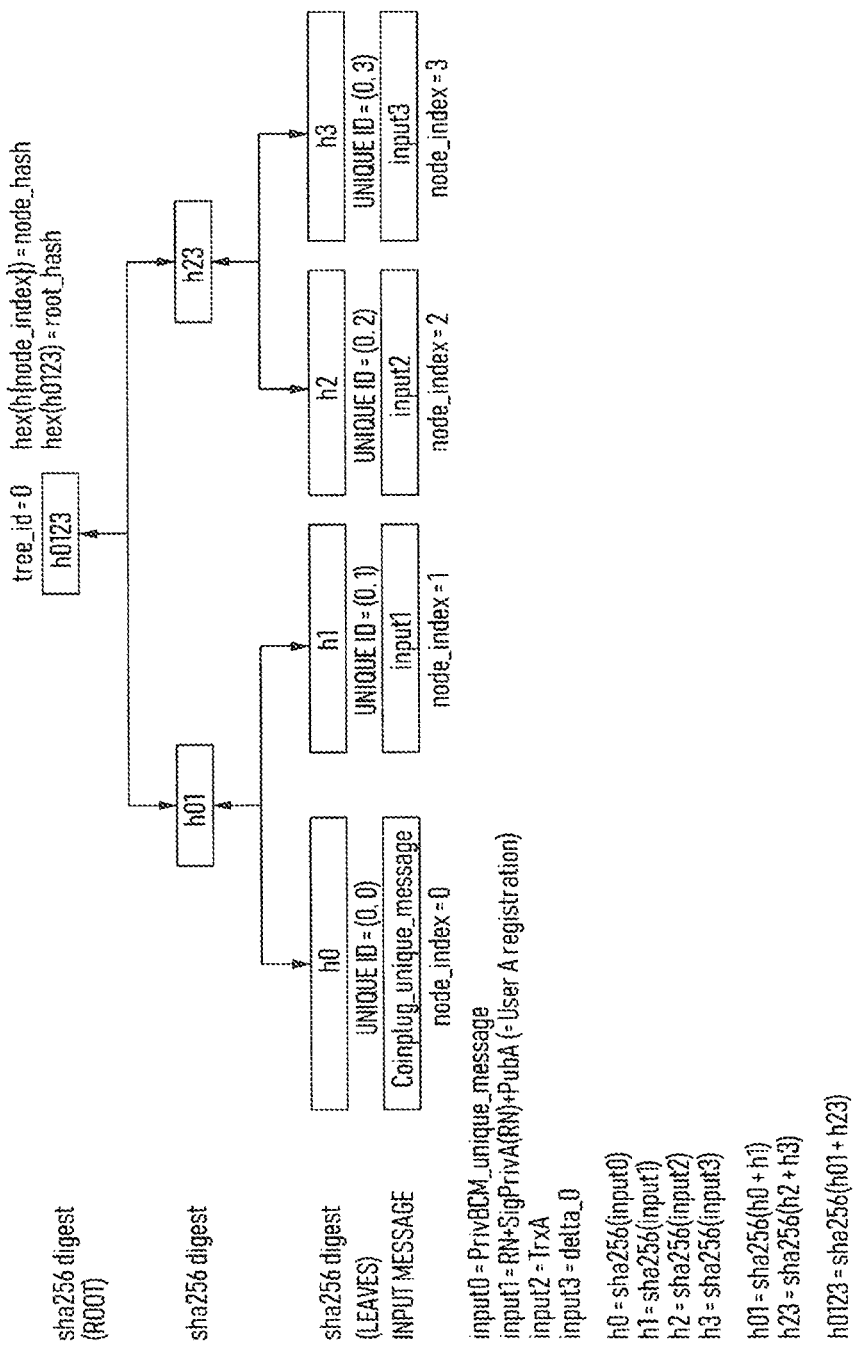

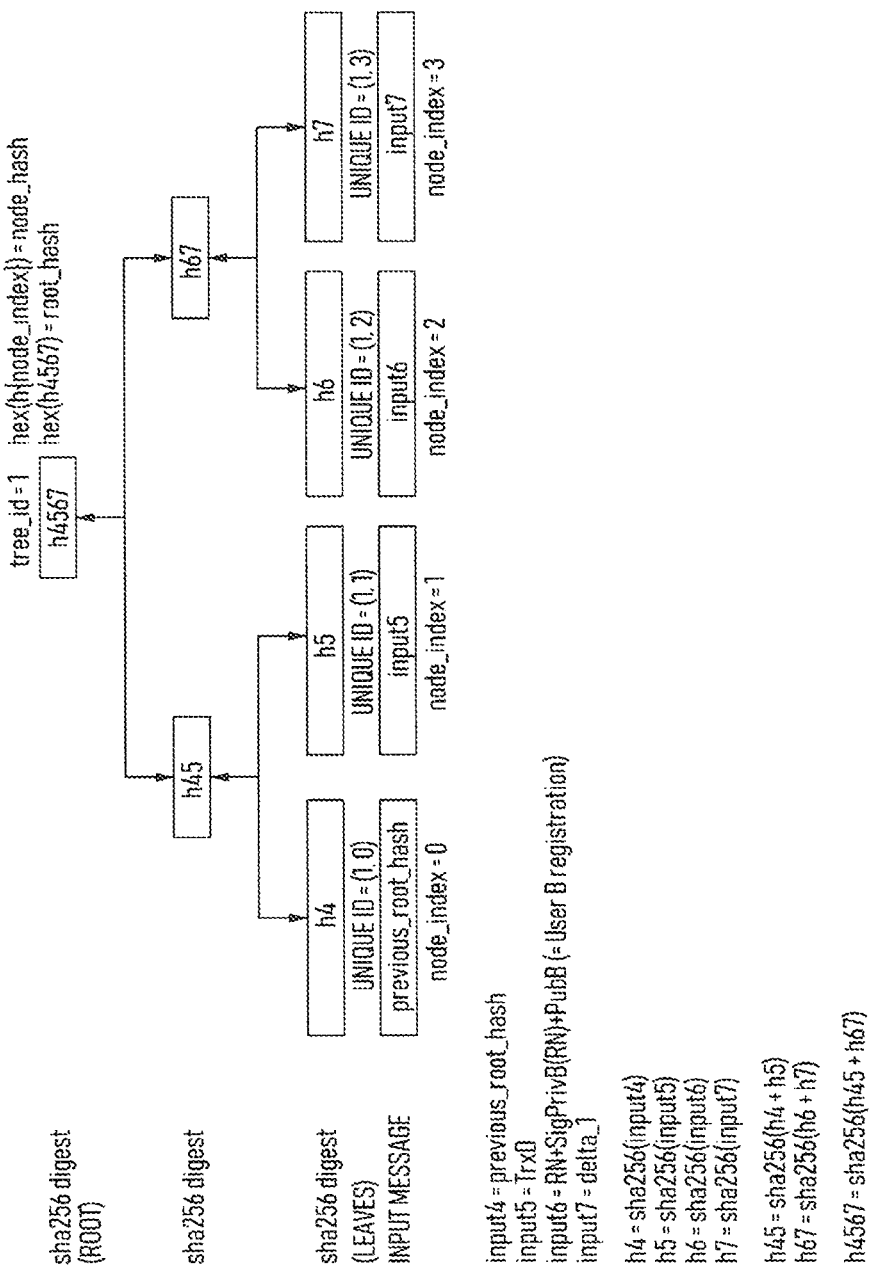

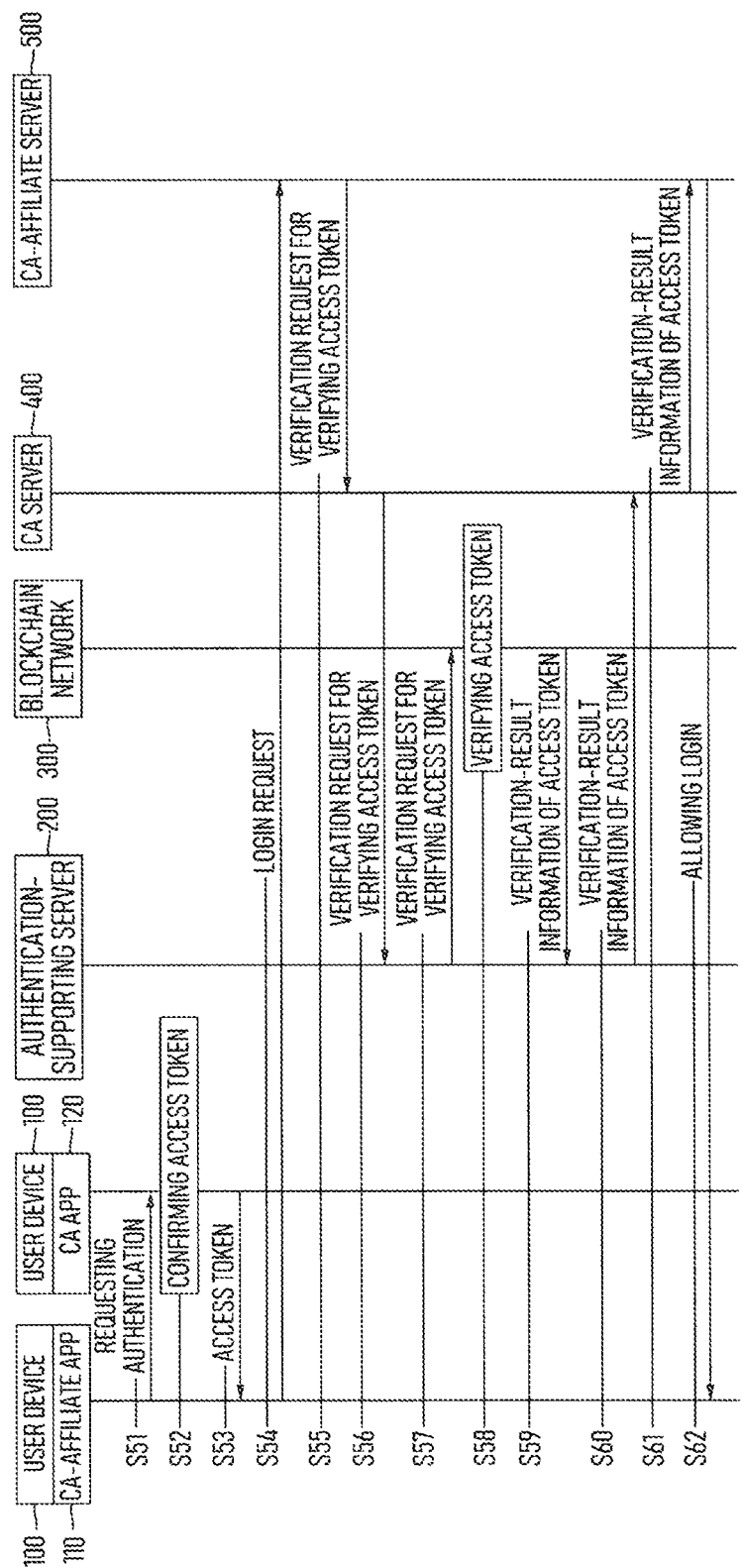

__METHOD FOR OAUTH SERVICE THROUGH BLOCKCHAIN NETWORK, AND TERMINAL AND SERVER USING THE SAME__

FIELD OF THE DISCLOSURE

The present disclosure relates to a method for authentication based on a blockchain network; and more particularly, to the method for allowing an app to log in to a service server, and the authentication-supporting server using the same.

BACKGROUND OF THE DISCLOSURE

OAuth is an authentication procedure developed as a way, based on a single OpenID, for Internet users to grant websites or applications access to their information on other websites but without giving them their passwords. The OAuth protocol specifies a process for the websites and applications to share authentication without a separate authentication procedure. That is, the OAuth protocol is a protocol for resource owners, i.e., clients, to authorize third-party access to their resources by the websites or applications without disclosing their credentials or identifiers.

In addition, OAuth has been constantly revised from OAuth core 1.0 in December 2007 to recent OAuth 2.0 to set access permissions per client and to prevent client information from being exposed to a third party. The OAuth protocol can acquire access to resources in a resource server by using a token issued by an authentication server.

However, the currently effective OAuth protocol does not specify a limit on the number of tokens that can be used by a client.

Therefore, when using the OAuth protocol, a malicious client that already acquired a legitimate token can access the resource server several times in an attempt to do some malicious activities.

Particularly, in the conventional OAuth, when the authentication information of the user is hijacked by an attacker, then the attacker can access all of affiliate services related to a corresponding OpenID.

Therefore, there is a need for a new security algorithm like OAuth that can effectively protect the authentication information of the user such as personal information from external attacks while allowing authentication to be shared among the applications without the separate authentication procedure.

SUMMARY OF THE DISCLOSURE

It is an object of the present disclosure to solve all the aforementioned problems.

It is another object of the present disclosure to provide authentication to protect authentication information on users from external attacks using blockchain technology.

It is still another object of the present disclosure to provide the authentication capable of ensuring information security and preventing forgery and falsification by registering at least one access token in a blockchain network using specific functions and cryptography technology.

It is still yet another object of the present disclosure to provide the authentication to prevent an identity theft in advance by verifying the access token for the authentication by using the blockchain technology capable of preventing forgery and falsification completely.

In accordance with one aspect of the present disclosure, there is provided a method for authentication based on a blockchain network, including steps of: (a) an authentication-supporting server, if verification-requesting information of at least one signature value is acquired from a certificate authority (CA) app on a user device, in response to authentication-requesting information, including a verification value for reference, from a CA-affiliate app on the user device, wherein the verification-requesting information of the signature value includes the verification value for reference and the signature value created by signing the verification value for reference with a private key of the CA app, (i) verifying or supporting another device to verify the signature value, and, if the signature value is determined as valid, generating at least one access token, transmitting or supporting another device to transmit the access token to the user device, to thereby instruct the user device to receive and store the access token by way of the CA app, supporting the CA-affiliate app to transmit a login request to a CA-affiliate server using the access token, and registering or supporting another device to register the access token in the blockchain network, and (ii) transmitting or supporting another device to transmit a verification request for verifying the signature value to the blockchain network, to thereby instruct the blockchain network, if the signature value is determined as valid, to generate and transmit the access token to the authentication-supporting server, and to register the access token in the blockchain network, and (iii) transmitting or supporting another device to transmit the access token, if the access token is acquired from the blockchain network, to the user device, to thereby instruct the user device to receive and store the access token by way of the CA app, and to transmit the login request to the CA-affiliate server by way of the CA-affiliate app using the access token; and (b) the authentication-supporting server, if verification-requesting information of the access token including the access token is acquired from the CA-affiliate server directly or via the CA server, (I) performing one of processes of (i) verifying or supporting another device to verify the access token, and (ii) transmitting or supporting another device to transmit the verification request for verifying the access token to the blockchain network, to thereby instruct the blockchain network to verify the access token, and (II) if the access token is determined as valid, performing a process of transmitting or supporting one of another device and the CA server to transmit verification-result information of the access token to the CA-affiliate server, to thereby instruct the CA-affiliate server to allow the CA-affiliate app to log in to the CA-affiliate server, in response to the verification-result information of the access token.

As one example, at the step of (a), the authentication-supporting server either (i) confirms a verification value for comparison used for the signature value by using a public key corresponding to the CA app, and confirms whether the verification value for comparison is identical to the verification value for reference included in the verification-requesting information of the signature value, to thereby verify the signature value, or (ii) instructs the blockchain network to confirm the verification value for comparison used for the signature value by using the public key corresponding to the CA app, and to confirm whether the verification value for comparison is identical to the verification value for reference included in the verification-requesting information of the signature value, to thereby verify the signature value.

As one example, the access token includes either (i) at least part of user device-identifying information and user-identifying information, or (ii) at least one of a function value of the user device-identifying information and a function value of the user-identifying information.

As one example, at the step of (a), the login request from the CA-affiliate app on the user device to the CA-affiliate server includes at least part of the access token, the user device-identifying information, and the user-identifying information.

As one example, at the step of (b), the authentication-supporting server instructs the CA-affiliate server to store the access token in a storage device connected with the CA-affiliate server, in response to the verification-result information of the access token.

As one example, at the step of (b), the verification-result information of the access token includes at least part of the user device-identifying information and the user-identifying information.

As one example, at the step of (b), the authentication-supporting server either (i) transmits user information in addition to the verification-result information of the access token to the CA-affiliate server, or (ii) instructs one of another device and the CA server to transmit the user information in addition to the verification-result information of the access token to the CA-affiliate server.

In accordance with another aspect of the present disclosure, there is provided a method for authentication based on a blockchain network, including steps of: (a) an authentication-supporting server, on condition that, after verification-requesting information of at least one signature value being acquired from a certificate authority (CA) app on a user device in response to authentication-requesting information, including a verification value, from a CA-affiliate app on the user device, the authentication-supporting server has verified or supported a blockchain network to verify the signature value, and that after at least one access token being generated in response to the valid signature value, the authentication-supporting server has allowed the access token to be registered in the blockchain network and transmitted to the user device, to thereby allow the user device to receive and store the access token by way of the CA app, then if verification-requesting information of the access token including the access token is acquired from the CA-affiliate server directly or via a CA server in response to a login request, using the access token, from the CA-affiliate app on the user device, performing one of processes of (i) verifying or supporting another device to verify the access token, and (ii) transmitting or supporting another device to transmit a verification request for verifying the access token to the blockchain network, to thereby instruct the blockchain network to verify the access token; and (b) the authentication-supporting server, if the access token is determined as valid, performing a process of transmitting or supporting one of another device and the CA server to transmit verification-result information of the access token to the CA-affiliate server, to thereby instruct the CA-affiliate server to allow the CA-affiliate app to log in to the CA-affiliate server, in response to the verification-result information of the access token.

As one example, at the step of (a), the verification-requesting information of the access token is generated through processes of (i) confirming a login status of the user device by way of the CA app, in response to the authentication-requesting information including a verification value for reference by the CA-affiliate app on the user device, (i-1) if the CA app is determined as logged in, the CA app on the user device transmitting the stored access token to the CA-affiliate app on the user device, (i-2) if the CA app is determined as not logged in, the CA app on the user device transmitting to the authentication-supporting server the verification-requesting information of the signature value value wherein the verification-requesting information of the signature value includes the verification value for reference and the signature value created by signing the verification value for reference with a private key of the CA app, to thereby instruct the authentication-supporting server to verify or support one of another device or the blockchain network to verify the signature value, and the CA app transmitting the stored access token to the CA-affiliate app if the authentication-supporting server determines the signature value as valid, and (ii) the CA-affiliate server creating the verification-requesting information of the access token, in response to a login request, using the access token, from the CA-affiliate app.

In accordance with still another aspect of the present disclosure, there is provided an authentication-supporting server for authentication based on a blockchain network, including: at least one memory that stores instructions; and at least one processor configured to execute the instructions to perform or support another device to perform processes of: (I) if verification-requesting information of at least one signature value is acquired from a certificate authority (CA) app on a user device, in response to authentication-requesting information, including a verification value for reference, from a CA-affiliate app on the user device, wherein the verification-requesting information of the signature value includes the verification value for reference and the signature value created by signing the verification value for reference with a private key of the CA app, (i) verifying the signature value, and, if the signature value is determined as valid, generating at least one access token, transmitting the access token to the user device, to thereby instruct the user device to receive and store the access token by way of the CA app, supporting the CA-affiliate app to transmit a login request to a CA-affiliate server using the access token, and registering the access token in the blockchain network, and (ii) transmitting a verification request for verifying the signature value to the blockchain network, to thereby instruct the blockchain network, if the signature value is determined as valid, to generate and transmit the access token to the authentication-supporting server, and to register the access token in the blockchain network, and (iii) transmitting the access token, if the access token is acquired from the blockchain network, to the user device, to thereby instruct the user device to receive and store the access token by way of the CA app, and to transmit the login request to the CA-affiliate server by way of the CA-affiliate app using the access token, and (II) if verification-requesting information of the access token including the access token is acquired from the CA-affiliate server directly or via the CA server, (II-1) one of (i) verifying the access token, and (ii) transmitting the verification request for verifying the access token to the blockchain network, to thereby instruct the blockchain network to verify the access token, and (II-2) if the access token is determined as valid, transmitting or supporting one of another device and the CA server to transmit verification-result information of the access token to the CA-affiliate server, to thereby instruct the CA-affiliate server to allow the CA-affiliate app to log in to the CA-affiliate server, in response to the verification-result information of the access token.

As one example, at the process of (I), the processor either (i) confirms a verification value for comparison used for the signature value by using a public key corresponding to the CA app, and confirms whether the verification value for comparison is identical to the verification value for reference included in the verification-requesting information of the signature value, to thereby verify the signature value, or (ii) instructs the blockchain network to confirm the verification value for comparison used for the signature value by using the public key corresponding to the CA app, and to confirm whether the verification value for comparison is identical to the verification value for reference included in the verification-requesting information of the signature value, to thereby verify the signature value.

As one example, the access token includes either (i) at least part of user device-identifying information and user-identifying information, or (ii) at least one of a function value of the user device-identifying information and a function value of the user-identifying information.

As one example, at the process of (I), the login request from the CA-affiliate app on the user device to the CA-affiliate server includes at least part of the access token, the user device-identifying information, and the user-identifying information.

As one example, at the process of (II), the processor instructs the CA-affiliate server to store the access token in a storage device connected with the CA-affiliate server, in response to the verification-result information of the access token.

As one example, at the process of (II), the verification-result information of the access token includes at least part of the user device-identifying information and the user-identifying information.

As one example, at the process of (II), the processor either (i) transmits user information in addition to the verification-result information of the access token to the CA-affiliate server, or (ii) instructs one of another device and the CA server to transmit the user information in addition to the verification-result information of the access token to the CA-affiliate server.

In accordance with still yet another aspect of the present disclosure, there is provided an authentication-supporting server for authentication based on a blockchain network, including: at least one memory that stores instructions; and at least one processor configured to execute the instructions to perform or support another device to perform processes of: (I) on condition that, after verification-requesting information of at least one signature value being acquired from a certificate authority (CA) app on a user device in response to authentication-requesting information, including a verification value, from a CA-affiliate app on the user device, the authentication-supporting server has verified or supported a blockchain network to verify the signature value, and that after at least one access token being generated in response to the valid signature value, the authentication-supporting server has allowed the access token to be registered in the blockchain network and transmitted to the user device, to thereby allow the user device to receive and store the access token by way of the CA app, then if verification-requesting information of the access token including the access token is acquired from the CA-affiliate server directly or via a CA server in response to a login request from the CA-affiliate app on the user device, one of (i) verifying the access token, and (ii) transmitting a verification request for verifying the access token to the blockchain network, to thereby instruct the blockchain network to verify the access token, and (II) if the access token is determined as valid, transmitting or supporting one of another device and the CA server to transmit verification-result information of the access token to the CA-affiliate server, to thereby instruct the CA-affiliate server to allow the CA-affiliate app to log in to the CA-affiliate server, in response to the verification-result information of the access token.

As one example, at the process of (I), the verification-requesting information of the access token is generated through processes of (i) confirming a login status of the user device by way of the CA app, in response to the authentication-requesting information including a verification value for reference by the CA-affiliate app on the user device, (i-1) if the CA app is determined as logged in, the CA app on the user device transmitting the stored access token to the CA-affiliate app on the user device, (i-2) if the CA app is determined as not logged in, the CA app on the user device transmitting to the authentication-supporting server the verification-requesting information of the signature value value wherein the verification-requesting information of the signature value includes the verification value for reference and the signature value created by signing the verification value for reference with a private key of the CA app, to thereby instruct the authentication-supporting server to verify or support one of another device or the blockchain network to verify the signature value, and the CA app transmitting the stored access token to the CA-affiliate app if the authentication-supporting server determines the signature value as valid, and (ii) the CA-affiliate server creating the verification-requesting information of the access token, in response to a login request, using the access token, from the CA-affiliate app.

Further, in accordance with one example embodiment of the present disclosure, a user device and a server for performing methods mentioned above is provided.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which:

FIG. 2 is a drawing schematically illustrating a method for performing an authentication based on the blockchain network in accordance with one example embodiment of the present disclosure.

FIGS. 3 and 4 are drawings schematically illustrating another example of registering transactions related to the authentication in the blockchain network in accordance with one example embodiment of the present disclosure.

FIG. 5 is a drawing schematically illustrating another method for performing the authentication based on the blockchain network in accordance with another example embodiment of the present disclosure.

DETAILED DESCRIPTION OF THE PREFERRED EMBODIMENTS

Figure 1:
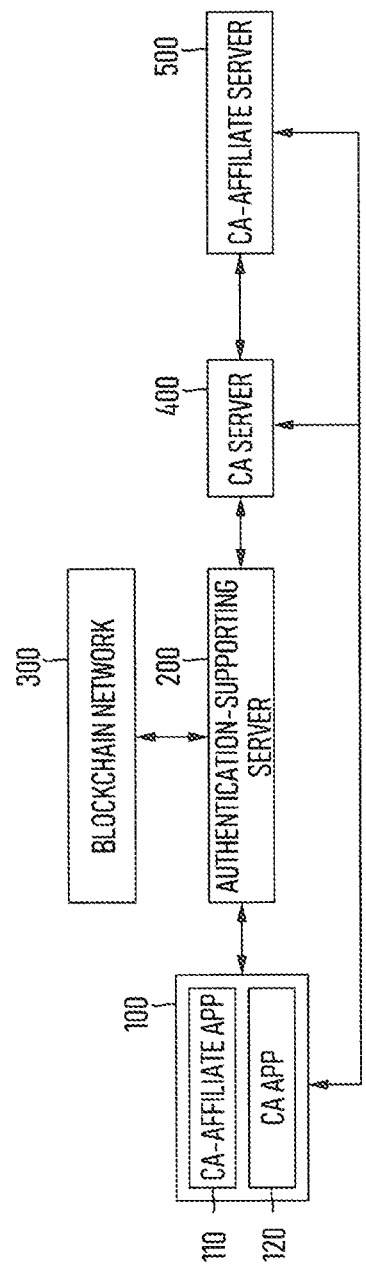
FIG. 1 is a drawing schematically illustrating an authentication system based on a blockchain network in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

In the description below, the phrase "for reference" is added for terms related to objects or concepts that are registered or stored, etc. in advance to be used as a reference, and the phrase "for comparison" is added for terms related to objects or concepts that are presented or requested to be compared with the reference, to avoid possible confusion.

Throughout the present disclosure, every processor, every memory, every storage, or any other computing components are described as separate components, however, said every processor, said every memory, said every storage, or said any other computing components may be configured as a single device or any other combinations thereof.

Also, a specific function used in the present disclosure may be a hashing function, and a function value may be a hash value generated by using the hashing function, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating an authentication system based on a blockchain network in accordance with one example embodiment of the present disclosure. By referring to FIG. 1, the authentication system may include at least one user device 100, at least one authentication-supporting server 200, at least one blockchain network 300, at least one certificate authority (CA) server 400, and at least one CA-affiliate server 500.

First, the user device 100 may be a device displaying information served by at least one CA app 120 and at least one CA-affiliate app 110 to users and performing an authentication, and may include a PC (Personal Computer), a mobile computer, a PDA/EDA, a mobile phone, a smart phone, a tablet, etc. And, the user device 100 is not limited thereto, and may include any communication device like a digital camera, a personal navigation device, and a mobile gaming device, etc. capable of wired and wireless communication. In addition, the user device 100 may include a communication part, a memory, and a processor.

Next, the authentication-supporting server 200 may perform the authentication based on the blockchain network and may include a communication part, not illustrated, and a processor, not illustrated. Identical reference numerals are for convenience of explanation but not intended for representing sameness of separate devices. Further, in accordance with another example, the method may be performed by the authentication-supporting server 200 or another server of a different configuration. Also, the authentication-supporting server 200 may be a server corresponding to one of nodes in the blockchain network, or may be a server managing each of the nodes in the blockchain network, or may be a transaction server.

Specifically, the authentication-supporting server 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP session, but the scope of the present disclosure is not limited thereto. For example, they could be transmitted and received as UDP datagrams.

Also, the processors of such devices may include hardware configuration of MPU (Micro Processing Unit) or CPU (Central Processing Unit), cache memory, data bus, etc. Additionally, any OS and software configuration of applications that achieve specific purposes may be further included.

Next, the blockchain network 300 may perform distributive processing of data, i.e., connecting blocks of the data in a chain-like manner and recording them in distributed ledgers. Herein, the blockchain network 300 may be comprised of multiple blockchain networks, and each of the multiple blockchain networks may be any of a private blockchain network and a public blockchain network.

Next, the CA server 400 may provide various services for the users via the CA app 120 on the user device 100, may provide interfaces to communicate with other servers, and may include a communication part, a memory, and a processor.

Next, the CA-affiliate server 500 may provide various services for the users via the CA-affiliate app 110 on the user device 100, may provide the authentication to the CA-affiliate app 110 by using user-identifying information, etc. acquired from the CA server 400 in affiliation, and may include a communication part, a memory, and a processor.

A method for the authentication based on the blockchain network via the authentication system configured as such in accordance with one example embodiment of the present disclosure is described as follows.

First, the method for the authentication based on the blockchain network in accordance with one example embodiment of the present disclosure is disclosed by referring to FIG. 2.

A user may instruct the CA-affiliate app 110 on the user device 100 to generate authentication-requesting information at a step of S1, to use the services of the CA-affiliate server 500 via the user device 100. Herein, the CA-affiliate app 110 may sign and transmit a verification value for reference to be used for verifying a signature value using the CA app 120 by calling the CA app 120 via a URL scheme, and the authentication-requesting information may include the verification value for reference, and the verification value for reference may include a nonce, a one time password (OTP), or a time stamp, etc.

And, the CA app 120 on the user device 100 may generate a signature value by digitally signing the verification value for reference included in the authentication-requesting information with a private key of the CA app 120 at a step of S2. Herein, the private key of the CA app 120 may be a private key of a Public Key Infrastructure (PKI) certificate generated for user authentication of the user of the CA app 120, and a public key corresponding to the private key of the CA app 120 may already have been registered in the blockchain network 300. Also, the user device 100 may require the user to enter path information including at least part of a password, a PIN code, fingerprint information on the user, and biometric information on the user, and may allow digital signing by using the private key of the CA app 120 only if the user-entered path information is identical to its corresponding preset path information.

Thereafter, the CA app 120 of the user device 100 may transmit a verification request for the signature value to the authentication-supporting server 200 at a step of S3. Herein, verification-requesting information of the signature value to verify the signature value may include the signature value and the verification value for reference acquired from authentication-requesting information. Also, the verification-requesting information of the signature value may include at least part of (i) user device-identifying information such as a universally unique identifier (UUID), etc. and (ii) user-identifying information such as a phone number, etc.

Then, the authentication-supporting server 200 may verify or support another device to verify the signature value in response to the verification-requesting information of the signature value acquired via its communication part.

As one example, the authentication-supporting server 200 may acquire a public key corresponding to the CA app 120 stored in another device connected with the authentication-supporting server 200, i.e., the public key stored as corresponding to the user-identifying information or the user device-identifying information, or the public key corresponding to the CA app 120 from the blockchain network 300, may confirm a verification value for comparison by using the public key corresponding to the CA app 120, and may confirm whether the verification value for comparison is identical to the verification value for reference included in the verification-requesting information of the signature value, to thereby verify the signature value. And, if the signature value is determined as valid, the authentication-supporting server 200 may generate at least one access token, to thereby transmit or support another device connected with the authentication-supporting server 200 to transmit the access token to the user device 100 at a step of S7. Also, the authentication-supporting server 200 may register or support another device connected with the authentication-supporting server 200 to register the generated access token in the blockchain network 300. Herein, the access token may include (i) at least part of the user device-identifying information, the user-identifying information, and the signature value, or (ii) at least one of a function value of the user device-identifying information, a function value of the user-identifying information, and a function value of the signature value. Herein, the function value may represent a hash value generated by using a specific function, i.e., a hash function, but the scope of the present disclosure is not limited thereto.

As another example, the authentication-supporting server 200 may transmit or support another device connected with the authentication-supporting server 200 to transmit a verification request for verifying the signature value to the blockchain network 300 at a step of S4. Then, the blockchain network 300 may confirm the verification value for comparison by using the public key corresponding to the CA app 120, and may confirm whether the verification value for comparison is identical to the verification value for reference included in the verification-requesting information of the signature value, to thereby verify the signature value at a step of S5. And, if the signature value is determined as valid, the blockchain network 300 may generate and register the access token in the blockchain network 300, and may transmit the generated access token to the authentication-supporting server 200 at a step of S6, and the authentication-supporting server 200 may transmit or support another device connected with the authentication-supporting server 200 to transmit the acquired access token to the user device 100 at the step of S7.

Although the access token is registered in the blockchain network 300 in the explanation above, the blockchain network 300 may be configured with multiple blockchain networks. As one example, if the blockchain network 300 is configured with a first blockchain network and a second blockchain network, the authentication-supporting server 200 may register the access token in the first blockchain network and the second blockchain network as below.

The authentication-supporting server 200 may register or support another device connected with the authentication-supporting server 200 to register the access token in the first blockchain network.

And, if one of anchoring conditions for registering a function value in the second blockchain network is satisfied, the authentication-supporting server 200 may generate a representative function value or its processed value calculated by using (i) a specific function value created by applying the specific function to the access token and (ii) its corresponding at least one associated function value.

Also, the authentication-supporting server 200 may register the generated representative function value or its processed value in the second blockchain network, or may instruct the first blockchain network or another device connected with the authentication-supporting server 200 to register the generated representative function value or its processed value in the second blockchain network.

Meanwhile, the authentication-supporting server 200 may store and manage the specific function value and the associated function value in a certain data structure. Herein, the data structure may vary and one example may be a Merkle tree or a Patricia tree, but the scope of the present disclosure is not limited thereto.

That is, the authentication-supporting server 200 may generate or support another device to generate the Merkle tree whose specific leaf node has the specific function value, e.g., a specific hash value. If one of the anchoring conditions is satisfied, the authentication-supporting server 200 may register the representative function value, e.g., a representative hash value, or its processed value in the second blockchain network, or may support the first blockchain network or another device connected with authentication-supporting server 200 to register the representative hash value or its processed value in the second blockchain network.

More specifically, (x1) the authentication-supporting server 200 may calculate or support another device connected with the authentication-supporting server 200 to calculate an intermediate value by using (i) the specific hash value and (ii) a function value, e.g., a hash value, allocated to a sibling node of a specific leaf node where the specific hash value is allocated, and may allocate or support another device connected with the authentication-supporting server 200 to allocate a hash value of the intermediate value to a parent node of the specific leaf node. (x2) If the parent node is a root node of the Merkle tree, the hash value of the intermediate value allocated to the parent node becomes the representative hash value or its processed value. (x3) If the parent node is not the root node, the authentication-supporting server 200 may repeat the processes from (x1) to (x3) by regarding the hash value allocated to the parent node as the specific hash value and regarding the parent node as the specific leaf node.

Then, the authentication-supporting server 200 may register or support the first blockchain network or another device connected with the authentication-supporting server 200 to register the hash value finally allocated to the root node of the Merkle tree in the second blockchain network, as the representative hash value or its processed value. Herein, for example, said its processed value may be acquired by applying a hex computation to the representative hash value.

Meanwhile, if the authentication-supporting server 200 stores the specific hash value and the associated hash value in a (1_1)-st data structure and then stores and manages a (1_2)-nd data structure identical in a form to the (1_1)-st data structure, the (1_1)-st data structure and the (1_2)-nd data structure may be connected in a form of a chain.

Especially, as aforementioned, if the (1_1)-st data structure and the (1_2)-nd data structure are Merkle trees, a root value of the (1_1)-st data structure or a hash value of the root value may be allocated to a first leaf node of the (1_2)-nd data structure.

Moreover, data integrity may be further ensured by verifying the (1_1)-st data structure when the (1_2)-nd data structure is created. The verification of the (1_2)-nd data structure will be explained later.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of a Merkle tree, a hash value of an input message firstly given by the authentication-supporting server 200 may be allocated.

FIGS. 3 and 4 are drawings illustrating examples of Merkle trees created in accordance with one example embodiment of the present disclosure.

FIG. 3 illustrates a Merkle tree with four leaf nodes. As the illustrated Merkle tree is a first Merkle tree whose tree_id is zero, a hash value sha256(coinplug_unique_message) of a certain message data is allocated to an h0 node which is a first leaf node. If there is a request for a registration of a piece of data, the authentication-supporting server 200 may create a next leaf node next to a last leaf node of the first Merkle tree being generated, and may allocate or support another device to allocate the specific hash value or it processed value to said next leaf node. For example, if an allocation of values is completed with an h1 node as a last which is a second leaf node of the Merkle tree in FIG. 3, and if a new leaf node is to be created, then an h2 node which is a next leaf node may be created and a specific hash value sha256(input2) or its processed value may be allocated to the h2 node. Also, the authentication-supporting server 200 may calculate or support another device to calculate an intermediate value by using (i) the specific hash value allocated to the h2 node and (ii) a hash value allocated to a h3 node which is a sibling node of the h2 node. The hash value of the calculated value may be allocated to an h23 node which is a parent node of the h2 node and the h3 node. Because the parent node, i.e., the h23 node, is not the root node of the Merkle tree, the authentication-supporting server 200 may repeat the processes by regarding the hash value allocated to the h23 node as the specific hash value. In other words, with the hash value allocated to the h23 node as the specific hash value, the hash values allocated to the h23 node and an h01 node may be used together to be calculated and allocated to an h0123 node which is a parent node of the h23 node and the h01 node. Herein, as the h0123 node is the root node, the authentication-supporting server 200 may register or support the first blockchain network or another device connected with the authentication-supporting server 200 to register the processed value hex(h{node index}) of the hash value allocated to the h0123 node in the second blockchain network.

Meanwhile, the anchoring conditions may include at least one of (i) a condition that a certain number of the transactions and the access token are generated, (ii) a condition that a certain amount of time is elapsed, (iii) a condition that a block is created in the (1_1)-st blockchain network, and (iv) a condition about at least one of characteristics of the services.

On the other hand, for example, if the same number of the transactions related to the access token as the number of leaf nodes in a Merkle tree to be created are acquired, the authentication-supporting server 200 may create the Merkle tree and may register or support another device to register the root value of the Merkle tree in the second blockchain network.

Also, the authentication-supporting server 200 may create a root value of the Merkle tree aforementioned at stated intervals, by referring to the condition (ii) above. In this case, the authentication-supporting server 200, if the certain amount of time is elapsed, may create the Merkle tree by referring to input values by that time, and may register or support the first blockchain network or another device connected with the authentication-supporting server 200 to register the root value of the Merkle tree in the second blockchain network.

However, in this case, no value may be allocated to a sibling node of the node to which the specific hash value is allocated even though the certain amount of time is elapsed. In case no hash value is allocated to the sibling node even though one of the anchoring conditions is met, the authentication-supporting server 200 may allocate or support another device to allocate a certain hash value to the sibling node, to thereby produce a root value of the Merkle tree by the method aforementioned. For example, the authentication-supporting server 200 may copy and allocate or support another device to allocate the specific hash value to the sibling node.

And, the characteristics of the services may be at least part of (i) information on a cost provided by an issuer of the transaction related to the access token, (ii) information on a time-zone during which a registration of the transaction related to the access token is performed, (iii) information on a location where the registration service of the transaction is performed and (iv) information on a type of a company that requested the registration of the transaction. However, the scope of the present disclosure is not limited thereto.

Meanwhile, if a creation of a new Merkle tree starts and if one of the anchoring conditions is satisfied without the transaction related to the access token, the authentication-supporting server 200 may create or support another device to create the new Merkle tree by allotting certain message data to its first and second leaf nodes and may register or support the first blockchain network or another device connected with the authentication-supporting server 200 to register the root value of the new Merkle tree or its processed value in the second blockchain network. In this case, the new Merkle tree with two leaf nodes may be created.

Also, as aforementioned, if the authentication-supporting server 200 stores the specific hash value and its at least one associated hash value in the (1_1)-st data structure and then stores and manages the (1_2)-nd data structure identical in a form to the (1_1)-st data structure, the (1_1)-st data structure and the (1_2)-nd data structure may be connected in a form of a chain. Especially, if the (1_1)-st data structure and the (1_2)-nd data structure are Merkle trees, a root value of the (1_1)-st data structure or a hash value of the root value may be allocated to a first leaf node of the (1_2)-nd data structure.

FIG. 4 is a drawing illustrating an example of a Merkle tree created in a form of the (1_2)-nd data structure in accordance with one example embodiment of the present disclosure.

By referring to FIG. 4, it is clear that the root value hex(h0123) of the Merkle tree whose tree_id is zero in FIG. 3 is allocated as sha256(input4) to the first leaf node which is an h4 node of a new Merkle tree. In such a manner, the present disclosure has advantage of improving data integrity, as tracking becomes easier even in the case of data forgery, by connecting multiple data structures created when a transaction occurs.

By referring to FIG. 2 again, if the access token is transmitted from the authentication-supporting server 200, the user device 100 may receive the access token by way of the CA app 120 and may store the access token at a step of S8. Herein, the access token may be stored in a Secure Element (SE) of the user device 100. And, the CA app 120 on the user device 100 may transmit the access token to the CA-affiliate app 110 at a step of S9, and may instruct the CA-affiliate app 110 to transmit a login request to the CA-affiliate server 500 using the access token at a step of S10. Herein, the login request may include the at least part of the access token, the user device-identifying information, and the user-identifying information, but the scope of the present disclosure is not limited thereto, and may include at least one of their hash values.

And, in response to the login request from the CA-affiliate app 110 on the user device 100, the CA-affiliate server 500 may transmit the verification request, for verifying the access token acquired from the login request, to the authentication-supporting server 200 or may instruct the CA server 400 to transmit the verification request to the authentication-supporting server 200, at steps of S11 and S12. Herein, verification-requesting information of the access token may include at least part of the access token, the user device-identifying information, and the user-identifying information, or may include at least one of their hash values.

Then, in response to acquisition of the verification-requesting information of the access token from the CA-affiliate server 500 directly or via the CA server 400, the authentication-supporting server 200 may verify or support another device connected with the authentication-supporting server 200 to verify the access token. Also, the authentication-supporting server 200 may transmit or support another device connected with the authentication-supporting server 200 to transmit a verification request for verifying the access token to the blockchain network 300 at a step of S13, to thereby instruct the blockchain network 300 to verify the access token at a step of S14.

Herein, the verification of the access token may be performed by a process of confirming whether the access token for which the verification request is made is identical to the access token which has been registered in the blockchain network 300 in response to the user device-identifying information or the user-identifying information.

Meanwhile, if the blockchain network 300 is configured with the first blockchain network and the second blockchain network, the authentication-supporting server 200 may confirm the representative function value or its processed value registered in the second blockchain network in response to the user-identifying information or the user device-identifying information. Then, the authentication-supporting server 200 may confirm information on a specific tree including its leaf nodes registered in the first blockchain network as corresponding to the representative function value or its processed value confirmed in the second blockchain network. Also, the authentication-supporting server 200 may confirm or support another device to confirm the access token registered in the first blockchain network by referring to the information on the specific tree including its leaf nodes.

Thereafter, if the access token is determined as valid at a step of S15, the authentication-supporting server 200 may transmit verification-result information of the access token to the CA-affiliate server 500 or may support the CA server 400 or another device connected with the authentication-supporting server 200 to transmit the verification-result information of the access token to the CA-affiliate server 500 at steps of S16 and S18. Herein, the authentication-supporting server 200 may (i) confirm user information corresponding to the user device-identifying information or the user-identifying information at a step of S17 and transmit the confirmed user information in addition to the verification-result information of the access token to the CA-affiliate server 500, or (ii) may instruct the CA server 400 or another device connected with the authentication-supporting server 200 to confirm the user information corresponding to the user device-identifying information or the user-identifying information at the step of S17 and to transmit the user information in addition to the verification-result information of the access token to the CA-affiliate server 500.

Then, in response to the verification-result information of the access token, the CA-affiliate server 500 may allow the CA-affiliate app 110 on the user device 100 to log in to the CA-affiliate server 500 at a step of S19. Herein, the CA-affiliate server 500 may store the access token as corresponding to the user device-identifying information or the user-identifying information, and may additionally store the user information acquired in addition to the access token.

Next, the method for performing the authentication based on the blockchain network in accordance with another example embodiment of the present disclosure is disclosed by referring to FIG. 5.

First, the access token may be stored in the user device 100 by the same method as in FIG. 2.

That is, if the verification-requesting information of the signature value is acquired from the CA app 120 on the user device 100, in response to the authentication-requesting information, including the verification value, from the CA-affiliate app 110 on the user device 100, the authentication-supporting server 200 may verify or support the blockchain network 300 to verify the signature value, and if the access token is generated in response to the valid signature value, the authentication-supporting server 200 may allow the access token to be registered in the blockchain network 300 and transmitted to the user device 100, to thereby allow the user device 100 to receive and store the access token by way of the CA app 120.

Herein, the blockchain network 300 may be comprised of the first blockchain network and the second blockchain network as described by referring to FIG. 2, and the access token may be registered in the first blockchain network, and the representative value corresponding to the access token may be registered in the second blockchain network.

On condition that the access token has been stored in the user device 100 as above, the user may instruct the CA-affiliate app 110 on the user device 100 to generate the authentication-requesting information at a step of S51, to employ the services of the CA-affiliate server 500 via the user device 100. Herein, the CA-affiliate app 110 may sign and transmit the verification value for reference to verify the signature value using the CA app 120 by calling the CA app 120 via a URL scheme, and the authentication-requesting information may include the verification value for reference. Herein, the verification value for reference may include a nonce, a one time password (OTP), or a time stamp, etc.

And, the CA app 120 on the user device 100 may confirm the access token corresponding to the authentication-requesting information at a step of S52, and may transmit the confirmed access token to the CA-affiliate app 110 at a step of S53.

Detailed explanation is as follows.

The CA app 120 on the user device 100 may confirm a state of the CA app 120, in response to the authentication-requesting information.

Herein, if the CA app 120 is determined as in a log-in state, the CA app may transmit the stored access token to the CA-affiliate app 110 on the user device 100.

However, if the CA app 120 is determined as in a log-out state, the CA app 120 may generate the signature value by digitally signing the verification value for reference included in the authentication-requesting information with the private key of the CA app 120. And, the CA app 120 may transmit the verification request for verifying the signature value to the authentication-supporting server 200. Then, the authentication-supporting server 200 may verify or support another device to verify the signature value in response to the verification-requesting information of the signature value acquired via its communication part.

As one example, the authentication-supporting server 200 may acquire the public key corresponding to the CA app 120 stored in another device connected with the authentication-supporting server 200, i.e., the public key stored as corresponding to the user-identifying information or the user device-identifying information, or the public key corresponding to the CA app 120 from the blockchain network 300, may confirm the verification value for comparison used for the signature value by using the public key corresponding to the CA app 120, and may confirm whether the verification value for comparison is identical to the verification value for reference included in the verification-requesting information of the signature value, to thereby verify the signature value.

As another example, the authentication-supporting server 200 may transmit or support another device connected with the authentication-supporting server 200 to transmit a verification request for verifying the signature value to the blockchain network 300. Then, the blockchain network 300 may confirm the verification value for comparison used for the signature value by using the public key corresponding to the CA app 120, and may confirm whether the verification value for comparison is identical to the verification value for reference included in the verification-requesting information of the signature value, to thereby verify the signature value.

The access token is transmitted to the CA-affiliate app 110 on the user device 100 as above, the CA-affiliate app 110 may transmit a login request to the CA-affiliate server 500 at a step of S54. Herein, the login request may include the at least part of the access token, the user device-identifying information, and the user-identifying information, but the scope of the present disclosure is not limited thereto, and may include at least one of their function values.

Then, in response to the login request, the CA-affiliate server 500 may transmit the verification request, for verifying the access token acquired from the login request, to the authentication-supporting server 200 or may instruct the CA server 400 to transmit the verification request to the authentication-supporting server 200, at steps of S55 and S56. Herein, verification-requesting information of the access token may include at least part of the access token, the user device-identifying information, and the user-identifying information, or may include at least one of their function values.

Then, in response to acquisition of the verification-requesting information of the access token from the CA-affiliate server 500 directly or via the CA server 400, the authentication-supporting server 200 may verify or support another device connected with the authentication-supporting server 200 to verify the access token. Also, the authentication-supporting server 200 may transmit or support another device connected with the authentication-supporting server 200 to transmit a verification request for verifying the access token to the blockchain network 300 at a step of S57, to thereby instruct the blockchain network 300 to verify the access token at a step of S58.

Herein, the verification of the access token may be performed by a process of confirming whether the access token for which the verification request is made is identical to the access token which has been registered in the blockchain network 300 in response to the user device-identifying information or the user-identifying information.

Meanwhile, if the blockchain network 300 is configured with the first blockchain network and the second blockchain network, the authentication-supporting server 200 may confirm the representative function value or its processed value registered in the second blockchain network in response to the user-identifying information or the user device-identifying information. Then, the authentication-supporting server 200 may confirm information on a specific tree including its leaf nodes registered in the first blockchain network as corresponding to the representative function value or its processed value confirmed in the second blockchain network. Also, the authentication-supporting server 200 may confirm or support another device to confirm the access token registered in the first blockchain network by referring to the information on the specific tree including its leaf nodes.

Thereafter, if the access token is determined as valid at a step of S59, the authentication-supporting server 200 may transmit verification-result information of the access token to the CA-affiliate server 500 or may support the CA server 400 or another device connected with the authentication-supporting server 200 to transmit the verification-result information of the access token to the CA-affiliate server 500 at steps of S60 and S61.

Then, in response to the verification-result information of the access token, the CA-affiliate server 500 may allow the CA-affiliate app 110 on the user device 100 to log in to the CA-affiliate server 500 at a step of S62.

The present disclosure has an effect of efficiently protecting authentication information on the users from external attacks by implementing the authentication using the blockchain technology.

The present disclosure has another effect of providing the authentication capable of ensuring information security and preventing forgery and falsification by protecting the access token using specific functions and cryptography technology.

The present disclosure has still another effect of providing the authentication for preventing an identity theft in advance by verifying the access token for the authentication by using the blockchain technology capable of preventing forgery and falsification completely.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for authentication based on a blockchain network, comprising steps of:
   (a) performing either of a process (i) and a process (ii) after an authentication-supporting server acquires verification-requesting information of a signature value from a certificate authority (CA) app on a user device, wherein the verification-requesting information has been transmitted by the CA app on the user device in response to authentication-requesting information, including a verification value for reference having been acquired from a CA-affiliate app on the user device, and wherein the verification-requesting information of the signature value includes the verification value for reference and the signature value created by signing the verification value for reference with a private key of the CA app, wherein the process (i) includes:
      (i-1) one of verifying the signature value and supporting another device to verify the signature value,
      (i-2) in response to the signature value determined as valid, generating an access token,
      (i-3) one of transmitting the access token to the user device and supporting another device to transmit the access token to the user device, which receives and stores the access token using the CA app,
      (i-4) supporting the CA-affiliate app to transmit a login request to a CA-affiliate server using the access token, and
      (i-5) one of registering the access token and supporting another device to register the access token in distributed ledgers of the blockchain network, and wherein the process (ii) includes:
      (ii-1) one of transmitting a verification request and supporting another device to transmit the verification request for verifying the signature value to the blockchain network,
      (ii-2) instructing the blockchain network, in response to the signature value determined as valid, to generate the access token, to transmit the access token to the authentication-supporting server, and to register the access token in the distributed ledgers of the blockchain network,
      (ii-3) one of transmitting the access token and supporting another device to transmit the access token, in response to the access token acquired from the blockchain network, to the user device, which receives and stores the access token using the CA app, and
      (ii-4) supporting the CA-affiliate app to transmit the login request to the CA-affiliate server using the access token; and
   (b) the authentication-supporting server, in response to receiving verification-requesting information of the access token including that the access token was acquired from one of the CA-affiliate server directly and via the CA server,
      (I) performing one of:
         (i) one of verifying the access token and supporting another device to verify the access token, and
         (ii) one of transmitting the verification request and supporting another device to transmit the verification request for verifying the access token to the blockchain network, which verifies the access token, and
      (II) in response to the access token determined as valid by one of the authentication-supporting server and the blockchain network, performing one of transmitting verification-result information of the access token to the CA-affiliate server and supporting one of another device and the CA server to transmit the verification-result information of the access token to the CA-affiliate server, which allows the CA-affiliate app to log in to the CA-affiliate server, in response to the verification-result information of the access token determined as valid.

2. The method of claim 1, wherein, at the step of (a), the authentication-supporting server performs one of:
   (i) confirm a verification value for comparison used for the signature value by using a public key corresponding to the CA app, and confirm that the verification value for comparison is identical to the verification value for reference included in the verification-requesting information of the signature value, to thereby verify the signature value, and
   (ii) instruct the blockchain network to confirm the verification value for comparison used for the signature value by using the public key corresponding to the CA app, and confirm that the verification value for comparison is identical to the verification value for reference included in the verification-requesting information of the signature value, to thereby verify the signature value.

3. The method of claim 1, wherein the access token includes either one of:
   (i) at least part of user device-identifying information and user-identifying information, and
   (ii) at least one of a function value of the user device-identifying information and a function value of the user-identifying information.

4. The method of claim 1, wherein, at the step of (a), the login request from the CA-affiliate app on the user device to the CA-affiliate server includes at least part of the access token, the user device-identifying information, and the user-identifying information.

5. The method of claim 1, wherein, at the step of (b), the authentication-supporting server instructs the CA-affiliate server to store the access token in a storage device connected with the CA-affiliate server, in response to the verification-result information of the access token.

6. The method of claim 5, wherein, at the step of (b), the verification-result information of the access token includes at least part of the user device-identifying information and the user-identifying information.

7. The method of claim 5, wherein, at the step of (b), the authentication-supporting server performs one of:
   (i) transmit user information in addition to the verification-result information of the access token to the CA-affiliate server, and
   (ii) instruct one of another device and the CA server to transmit the user information in addition to the verification-result information of the access token to the CA-affiliate server.

8. A method for authentication based on a blockchain network, comprising steps of:
   (a) on condition that, after an authentication-supporting server acquires verification-requesting information of a signature value from a certificate authority (CA) app on a user device, wherein the verification-requesting information has been transmitted by the CA app on the user device in response to authentication-requesting information, including a verification value having been acquired from a CA-affiliate app on the user device, the authentication-supporting server performs one of verifying the signature value and supporting a blockchain network to verify the signature value, and after an access token being generated by one of the authentication-supporting server and the blockchain network in response to the valid signature value, the authentication-supporting server has allowed the access token to be registered in distributed ledgers of the blockchain network and transmitted to the user device, which has received and stored the access token using the CA app, then after the authentication-supporting server acquires verification-requesting information of the access token including that the access token is one of acquired from the CA-affiliate server directly and acquired via a CA server, wherein the verification-requesting information of the access token has been transmitted by the CA-affiliate server in response to a login request, including the access token having been acquired from the CA-affiliate app on the user device, the authentication-supporting server performing one of:
   (i) one of verifying the access token and supporting another device to verify the access token, and
   (ii) one of transmitting a verification request and supporting another device to transmit the verification request for verifying the access token to the blockchain network, which verifies the access token; and
   (b) the authentication-supporting server, in response to the access token determined as valid, performing one of transmitting verification-result information of the access token to the CA-affiliate server and supporting one of another device and the CA server to transmit the verification-result information of the access token to the CA-affiliate server, which allows the CA-affiliate app to log in to the CA-affiliate server, in response to the verification-result information of the access token determined as valid.

9. The method of claim 8, wherein, at the step of (a), the verification-requesting information of the access token is generated through processes of:
   (i) confirming a login status of the user device using the CA app, in response to the authentication-requesting information including a verification value for reference by the CA-affiliate app on the user device, performing one of:
      (i-1) in response to the CA app determined as logged in, the CA app on the user device transmitting the stored access token to the CA-affiliate app on the user device,
      (i-2) in response to the CA app determined as not logged in, the CA app on the user device transmitting to the authentication-supporting server the verification-requesting information of the signature value, wherein the verification-requesting information of the signature value includes the verification value for reference and the signature value created by signing the verification value for reference with a private key of the CA app, to thereby instruct the authentication-supporting server to one of verify the signature value and support one of another device and the blockchain network to verify the signature value, and the CA app transmitting the stored access token to the CA-affiliate app in response to the signature value determined as valid by the authentication-supporting server, and
   (ii) the CA-affiliate server creating the verification-requesting information of the access token, in response to a login request, using the access token, from the CA-affiliate app.

10. An authentication-supporting server for authentication based on a blockchain network, comprising:
a memory that stores instructions; and
a processor configured to execute the instructions to one of perform and support another device to perform processes of:
   (I) performing either of a process (i) and a process (ii) after the authentication-support server acquires verification-requesting information of a signature value from a certificate authority (CA) app on a user device, wherein the verification-requesting information has been transmitted by the CA app on the user device in response to authentication-requesting information, including a verification value for reference having been acquired from a CA-affiliate app on the user device, and wherein the verification-requesting information of the signature value includes the verification value for reference and the signature value created by signing the verification value for reference with a private key of the CA app, wherein the process (i) includes:

(i-1) one of verifying the signature value and supporting another device to verify the signature value, (i-2) in response to the signature value determined as valid, generating an access token, (i-3) one of transmitting the access token to the user device and supporting another device to transmit the access token to the user device, which receives and stores the access token using the CA app, (i-4) supporting the CA-affiliate app to transmit a login request to a CA-affiliate server using the access token, and (i-5) one of registering the access token and supporting another device to register the access token in distributed ledgers of the blockchain network, and wherein the process (ii) includes:

(ii-1) one of transmitting a verification request and supporting another device to transmit the verification request for verifying the signature value to the blockchain network, (ii-2) instructing the blockchain network, in response to the signature value determined as valid, to generate the access token, to transmit the access token to the authentication-supporting server, and to register the access token in distributed ledgers of the blockchain network, and (ii-3) one of transmitting the access token and supporting another device to transmit the access token, in response to the access token acquired from the blockchain network to the user device, which receives and stores the access token using the CA app, and (ii-4) supporting the CA-affiliate app to transmit the login request to the CA-affiliate server using the access token, and (II) the processor, in response to receiving verification-requesting information of the access token including that the access token was acquired from the CA-affiliate server one of directly and via the CA server, (II-1) performing one of:
  (i) one of verifying the access token and supporting another device to verify the access token, and
  (ii) one of transmitting the verification request and supporting another device to transmit the verification request for verifying the access token to the blockchain network, which verifies the access token, and (II-2) in response to the access token determined as valid by one of the authentication-supporting server and the blockchain network, performing one of transmitting verification-result information of the access token to the CA-affiliate server and supporting one of another device and the CA server to transmit the verification-result information of the access token to the CA-affiliate server, which allows the CA-affiliate app to log in to the CA-affiliate server, in response to the verification-result information of the access token determined as valid.

11. The authentication-supporting server of claim 10, wherein, at the process of (I), the processor performs one of:
  (i) confirm a verification value for comparison used for the signature value by using a public key corresponding to the CA app, and confirm that the verification value for comparison is identical to the verification value for reference included in the verification-requesting information of the signature value, to thereby verify the signature value, and
  (ii) instruct the blockchain network to confirm the verification value for comparison used for the signature value by using the public key corresponding to the CA app, and confirm that the verification value for comparison is identical to the verification value for reference included in the verification-requesting information of the signature value, to thereby verify the signature value.

12. The authentication-supporting server of claim 10, wherein the access token includes one of:
  (i) at least part of user device-identifying information and user-identifying information, and
  (ii) at least one of a function value of the user device-identifying information and a function value of the user-identifying information.

13. The authentication-supporting server of claim 10, wherein, at the process of (I), the login request from the CA-affiliate app on the user device to the CA-affiliate server includes at least part of the access token, the user device-identifying information, and the user-identifying information.

14. The authentication-supporting server of claim 10, wherein, at the process of (II), the processor instructs the CA-affiliate server to store the access token in a storage device connected with the CA-affiliate server, in response to the verification-result information of the access token.

15. The authentication-supporting server of claim 14, wherein, at the process of (II), the verification-result information of the access token includes at least part of the user device-identifying information and the user-identifying information.

16. The authentication-supporting server of claim 14, wherein, at the process of (II), the processor performs one of:
  (i) transmit user information in addition to the verification-result information of the access token to the CA-affiliate server, and
  (ii) instruct one of another device and the CA server to transmit the user information in addition to the verification-result information of the access token to the CA-affiliate server.

17. An authentication-supporting server for authentication based on a blockchain network, comprising:
  a memory that stores instructions; and
  a processor configured to execute the instructions to one of perform and support another device to perform processes of:
  (I) on condition that, after an authentication-supporting server acquires verification-requesting information of a signature value from a certificate authority (CA) app on a user device, wherein the verification-requesting information has been transmitted by the CA app on the user device in response to authentication-requesting information, including a verification value having been acquired from a CA-affiliate app on the user device, the authentication-supporting server performs one of verifying the signature value and supporting a blockchain network to verify the signature value, and that after an access token being generated by one of the authentication-supporting server and the blockchain network in response to the valid signature value, the authentication-supporting server has allowed the access token to be registered in distributed ledgers of the blockchain network and transmitted to the user device, which has received and stored the access token using the CA app, then after the authentication-supporting server acquires verification-requesting information of the access token including that the access token acquired from one of the CA-affiliate server directly and acquired via a CA server, wherein the verification-requesting information of the access token has been transmitted by the CA-affiliate server in response to a login request, including the access token having been acquired from the CA-affiliate app on the user device, performing one of:
  (i) one of verifying the access token and supporting another device to verify the access token, and
  (ii) one of transmitting a verification request and supporting another device to transmit the verification request for verifying the access token to the blockchain network, which verifies the access token, and
 (II) the processor, in response to the access token determined as valid, performing one of transmitting verification-result information of the access token to the CA-affiliate server and supporting one of another device and the CA server to transmit the verification-result information of the access token to the CA-affiliate server, which allows the CA-affiliate app to log in to the CA-affiliate server, in response to the verification-result information of the access token determined as valid.

18. The authentication-supporting server of claim 17, wherein, at the process of (I), the verification-requesting information of the access token is generated through processes of:

(i) confirming a login status of the user device using the CA app, in response to the authentication-requesting information including a verification value for reference by the CA-affiliate app on the user device, performing one of:
    (i-1) in response to the CA app determined as logged in, the CA app on the user device transmitting the stored access token to the CA-affiliate app on the user device,
    (i-2) in response to the CA app determined as not logged in, the CA app on the user device transmitting to the authentication-supporting server the verification-requesting information of the signature value, wherein the verification-requesting information of the signature value includes the verification value for reference and the signature value created by signing the verification value for reference with a private key of the CA app, to thereby instruct the authentication-supporting server to one of verify the signature value and support one of another device and the blockchain network to verify the signature value, and the CA app transmitting the stored access token to the CA-affiliate app in response to the signature value determined as valid by the authentication-supporting server, and
  (ii) the CA-affiliate server creating the verification-requesting information of the access token, in response to a login request, using the access token, from the CA-affiliate app.

* * * * *